US005751517A

United States Patent [19]
Agarwal

[11] Patent Number: 5,751,517
[45] Date of Patent: May 12, 1998

[54] AIR BEARING SLIDER HAVING DEBRIS REMOVING CHANNELS

[75] Inventor: Shashi B. Agarwal, Santa Clara, Calif.

[73] Assignee: Western Digital Corporation, Irvine, Calif.

[21] Appl. No.: 826,986

[22] Filed: Apr. 11, 1997

[51] Int. Cl.⁶ .................................................. G11B 5/60
[52] U.S. Cl. .................................................... 360/103
[58] Field of Search ...................................... 360/103

[56] References Cited

U.S. PATENT DOCUMENTS

| | | | |
|---|---|---|---|
| 4,212,044 | 7/1980 | Plotto | 360/103 |
| 4,636,898 | 1/1987 | Sazaki et al. | 360/122 |
| 5,134,531 | 7/1992 | Matsuzaki et al. | 360/103 |
| 5,136,438 | 8/1992 | Wakatsuki et al. | 369/69 |
| 5,157,568 | 10/1992 | Katayama et al. | 360/103 |
| 5,270,889 | 12/1993 | Muratomi | 360/103 |
| 5,424,884 | 6/1995 | Nomaka | 360/74.1 |
| 5,452,166 | 9/1995 | Aylwin et al. | 360/126 |
| 5,454,158 | 10/1995 | Fontana, Jr. et al. | 29/603 |
| 5,488,527 | 1/1996 | Komori et al. | 360/122 |
| 5,490,025 | 2/1996 | Dorius et al. | 360/103 |
| 5,513,056 | 4/1996 | Kawasaki et al. | 360/103 |
| 5,521,776 | 5/1996 | Mochizuki | 360/97.02 |

Primary Examiner—Robert S. Tupper
Attorney, Agent, or Firm—Leo J. Young; W. Chris Kim; Milad Shara

[57] ABSTRACT

An air bearing slider having debris removing channels for a hard disk drive. An air bearing slider contains a center pad having multiple longitudinal debris channels cut therein approximately 1-3 microns wide and approximately 1-3 microns deep and spanning the entire length of the air bearing surface of the center pad. The debris channels are effective for collecting small sized debris and passing them through the channel length and out the trailing end of the center pad. By this action, the debris are prevented from collecting along the edges, corners and on the top surface of the center pad or on and around the transducer situated on the center pad. By reducing debris in these locations, the debris does not alter the flying height of the slider with respect to the surface of the disk. Therefore, by eliminating debris around the transducer, this invention eliminates errors caused by the debris and thereby provides a more reliable disk drive.

21 Claims, 7 Drawing Sheets

AIR BEARING SLIDER HAVING DEBRIS REMOVING CHANNELS

BACKGROUND OF THE INVENTION

1. Field of the Invention

This invention relates to the field of air bearing sliders used in hard disk drives. Specifically, this invention relates to air bearing sliders that provide more consistent operating characteristics in an environment having debris and other particulate contamination.

2. Description of the Prior Art and Related Information

Within hard disk drives that use magnetic recording media, a small magnetic transducer is flown on an air bearing slider ("slider" or "head") over a spinning magnetic disk (e.g., usually a circular platter). This magnetic transducer is typically fabricated onto a pad of the slider which itself is mounted in a head stack assembly. An example of a slider is disclosed in U.S. Pat. No. 5,473,485 which discloses a tri-pad slider where a center pad contains a transducer.

As recording density is increasing steadily, it has become necessary within the field of hard disk drives to "fly" the magnetic transducer (and air bearing slider) ever closer to the magnetic disk. In so doing, the flying height of the transducer with respect to the magnetic disk needs to be precisely maintained during read and write operations of the disk drive to maintain high recording density.

Small sized debris, e.g., sized between approximately 0.1 and 3.0 um (micrometers or microns), and other particular contamination found in a disk drive environment that alter the flying height originate from various sources. One source of debris (e.g., organic debris, sand, silica, etc.) is from the contents of the disk drive inner environment itself as the inner environment is not entirely debris-free at sealing. Another source is from abutting moving parts of the disk drive itself. Yet another debris source is from carbon matter from the disk media.

Small sized debris and other particular contamination within the disk drive environment can collect on or around the slider pad, its surfaces, edges, and corners, or adjacent to the transducer, or can collect on the transducer itself. Debris on the slider, and particularly on the slider pad, can alter the flying height of the transducer and thereby cause data bit errors within the signals used during read and write operations of the disk drive. Accordingly, it would be advantageous to provide a mechanism to reduce debris content on and around the air bearing surfaces of a slider.

Debris within the disk drive environment that interferes with transducer activity can be classified into different types, among which are organic and inorganic (e.g., metallic, silica, etc.) debris. Organic debris migrating onto the pads of the slider or onto the transducer can alter the flying height of the slider by altering its geometry and thus altering its flying characteristics. By altering the flying height of the slider, bit errors can result in the disk drive's bit stream, reducing the overall reliability of the disk drive. Metallic debris on the transducer has the discussed disadvantages of organic debris, but further, metallic debris can migrate onto the transducer poles causing shorts between them, again causing bit errors. Therefore, inorganic debris can readily lead to performance degradation within the disk drive and also reduce its overall reliability.

Accordingly, what is needed is an air bearing surface of a slider that allows for low and maintained transducer flying height, but resists the migration of small particles of debris and other particulate contaminants onto its air bearing surfaces and on the transducer. What is needed yet is an air bearing surface of a slider that removes or renders harmless debris that attempts to collect on the pad of the slider. This invention provides such an air bearing surface of a slider.

SUMMARY OF THE INVENTION

This invention can be regarded as an air bearing slider for use in a disk drive, the slider having a leading side and a trailing side, first and second main rails each having an air bearing surface, and a center pad having an air bearing surface and disposed adjacent to the trailing side of the slider and between the first and second main rails, the center pad having a leading side, a trailing side, first and second side walls and a width between the first side wall and the second side wall. The slider also includes a transducer disposed within the center pad and at least one longitudinal channel disposed within the center pad between the transducer and one of the first and second side walls. The longitudinal channel extends across the air bearing surface of the center pad from the leading side of the center pad to the trailing side of the center pad in a direction substantially parallel to the main rails, and the longitudinal channel reduces contaminant buildup on the center pad by attracting contaminants and passing at least some of the contaminants through to the trailing side of the center pad. Within the slider, the longitudinal channel has a width that is relatively small compared to the width of the center pad such that the longitudinal channel has an insubstantial effect on air bearing flight characteristics of the slider.

The slider also includes a plurality of longitudinal channels disposed within the center pad between the transducer and the first side wall; and a second plurality of longitudinal channels disposed within the center pad between the transducer and the second side wall. The first and second plurality of longitudinal channels reduces contaminant buildup on the center pad by attracting contaminants and passing at least some of the contaminants through to the trailing side of the center pad. Each longitudinal channel extends across the air bearing surface of the center pad from the leading side to the trailing side of the center pad in a direction substantially parallel to the direction of air flow over the air bearing surface of the center pad.

This invention can also be regarded as a disk drive having a disk coupled to a spindle motor and a rotary actuator arrangement having a head stack assembly. The head stack assembly comprises an actuator arm coupled to an air bearing slider. The slider includes first and second main rails, each having an air bearing surface. The slider also includes a center pad having an air bearing surface and disposed adjacent to a trailing side of the slider and between the first and second main rails. The center pad includes a leading side, a trailing side, first and second side walls and a width between the first side wall and the second side wall. The slider also includes a transducer disposed within the center pad and at least one longitudinal channel disposed within the center pad between the transducer and one of the first and second side walls. The longitudinal channel extends across the air bearing surface of the center pad from the leading side of the center pad to the trailing side of the center pad in a direction substantially parallel to the direction of air flow over the air bearing surface of the center pad. The longitudinal channel reduces contaminant buildup on the center pad by attracting contaminants and passing at least some of the contaminants through to the trailing side of the center pad. Within the slider, the longitudinal channel has a width that is relatively small compared to the width of the

3 center pad such that the longitudinal channel has an insubstantial effect on air bearing flight characteristics of the slider.

DETAILED DESCRIPTION OF THE PREFERRED EMBODIMENTS

Figure 1A:
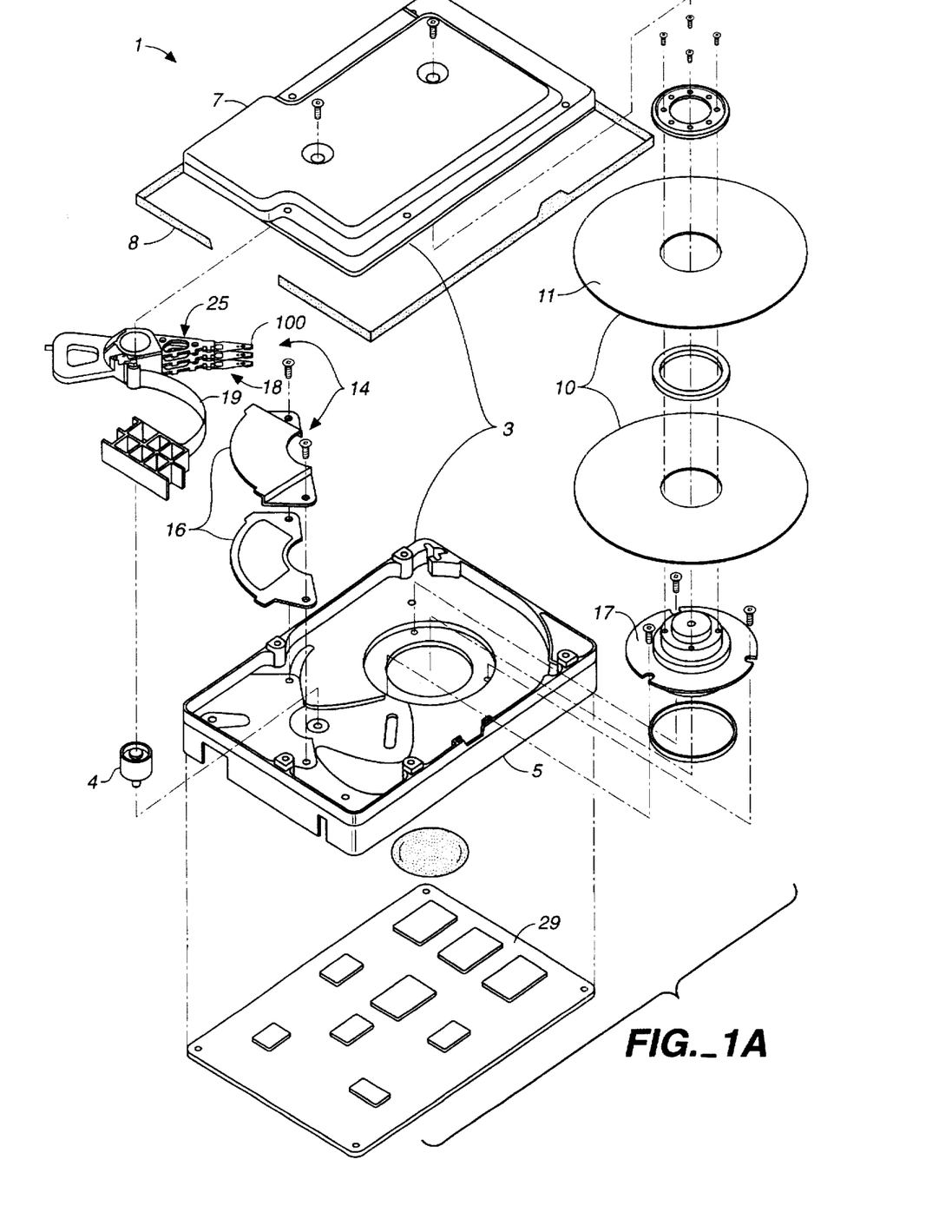
FIG. 1A is an exploded view of a hard disk drive having sliders implemented in accordance with this invention.

In FIG. 1A, hard disk drive 1 embodying this invention includes an enclosure 3 having a base 5 and a cover 7. Enclosure 3 is sealed to provide a relatively contaminate-free interior environment for a head disk assembly portion of disk drive 1. Suitably, a tape seal 8 or gasket device is used to seal enclosure 3. As discussed herein, although seal 8 is used, the interior environment of the disk drive 1 is not debris-free and does have some residual debris contents and other particulate contamination present.

Within the interior of disk drive 1, one or more magnetic disks 10 are present; each disk 10 having at least one data storing surface 11. The particular embodiment shown in FIG. 1A contains two disks 10 which provide four recording surfaces 11. Head stack assembly 18 contains multiple actuator arms 25 on which air bearing sliders 100 are affixed. A spindle motor 17, coupled to a central portion of each disk 10, causes each disk 10 to spin, preferably at a constant angular velocity.

Disk drive 1 of FIG. 1A also includes a rotary actuator arrangement generally indicated at 14. Rotary actuator arrangement 14 of FIG. 1A provides for positioning the magnetic transducers on the sliders 100 over a selected area of the recording surface 11 of disk 10. Rotary actuator arrangement 14 includes a permanent-magnet arrangement generally indicated at 16, a pivot bearing cartridge 4 and the head stack assembly 18. Pivot bearing cartridge 4 includes a stationary shaft secured to enclosure 3 to define an axis of rotation for rotary actuator arrangement 17. Head stack assembly 18 also includes a flex circuit assembly 19. Also included is a printed circuit board assembly 29.

Figure 1B:
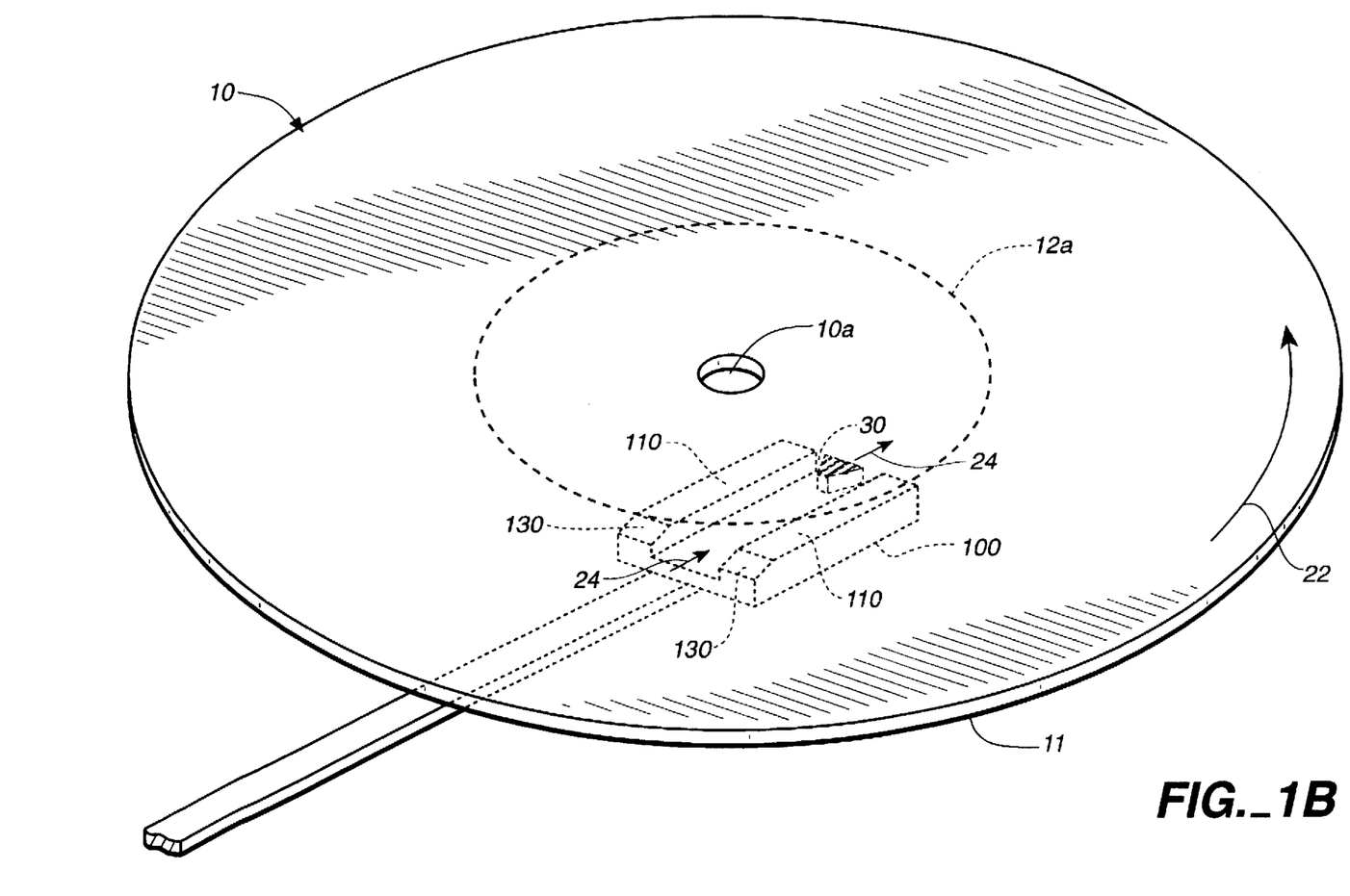
FIG. 1B is a perspective view depicting a tri-pad slider with the air bearing surfaces flying over a magnetic disk of the disk drive.

In FIG. 1B, a tri-pad slider 100 is situated under disk 10 to illustrate its center pad 30. Although multiple air bearing surfaces (ABS) are shown within the tri-pad slider 100, for instance side pads (main rails) 110 and center pad 30, only the center pad 30 contains a transducer (see FIG. 2A).

In operation, the slider 100 flies adjacent to a bottom surface 11 of a magnetic disk 10 which rotates about its center 10a in a primary direction of motion as indicated by arrow 22. Therefore, air flow (and debris migration) through the slider 100 is shown in the direction 24. In this configuration, the center pad (with transducer) 30 is mounted on the back of the slider 100 with respect to the relative movement of the slider 100 to the surface 11 of disk 10. The transducer in center pad 30 flies over a circular track 12a of disk 10. Ramps 130 located on the front of slider 100 push the back end of slider 100 downward, closer to surface 11 while in flight so that the slider 100 is pitched. When pitched, it is important to clear any small debris from between the slider's back end and the disk surface 11 so that the flying height of the slider 100 is not dramatically altered. This invention provides a mechanism for resisting debris buildup on the air bearing surface of the center pad 30 by removing debris particles from the air bearing surface via debris channels cut therein.

Figure 2A:
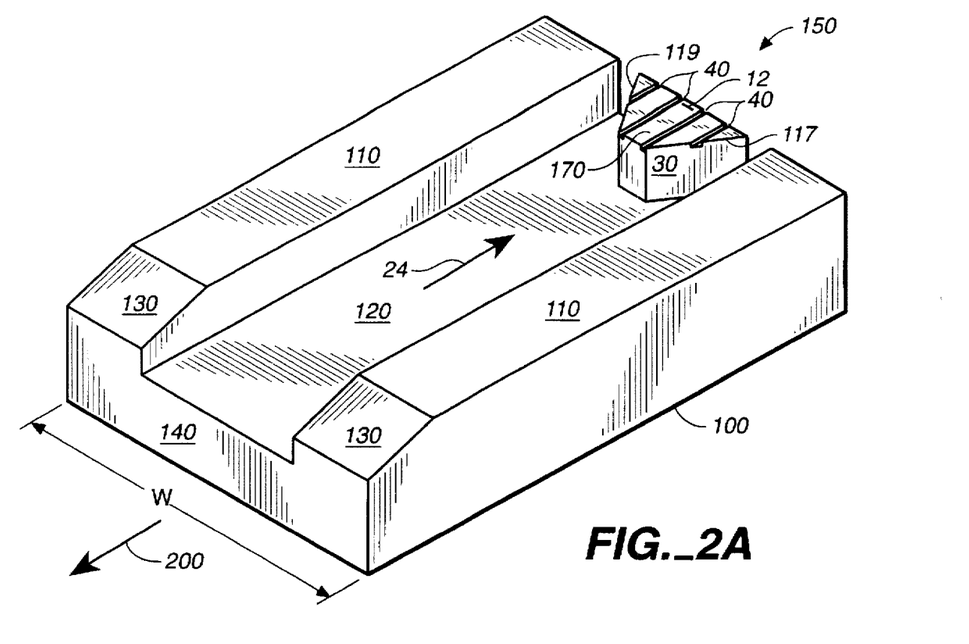
FIG. 2A is a perspective view of a first embodiment of this invention incorporated within a center pad of a tri-pad slider.

In FIG. 2A, a first embodiment of tri-pad slider 100 of this invention includes two main rails 110 located on either side of slider 100. Each main rail 110 contains its own air bearing surface located on the top surface of the rail. Also included are ramps or tapers 130 and front surface 140 which acts as a leading side of the slider 100. A central recessed region 120 is located between main rails 110. The relative direction of movement of slider 100 with respect to the surface 11 of disk 10 is shown as direction 200. Therefore, the back or trailing side of slider is shown as 150. The direction of air flow (and debris migration) over the recessed region 120 and between the main rails 110 is shown by arrow 24. In one exemplary implementation, the width W of air bearing slider 100 is approximately 60 mils, and slider 100 is approximately 80 mils long (measured from front 140 to back 150).

In FIG. 2A, slider 100 includes a center pad 30 implemented in accordance with this invention. The center pad 30 is disposed on top of surface 120 and has its trailing side situated along the trailing side 150 of slider 100. The top or air bearing surface 170 of the center pad 30 is on the same plane as the top surface of main rails 110. Center pad 30 contains transducer 12 which is situated along the trailing side of center pad 30 and situated further in the center of the center pad 30. As shown, multiple longitudinal debris channels 40 are cut into the top surface 170 of center pad 30 and extend in a direction parallel to the direction of air flow 24 through the slider 100 which is also parallel to the direction of the length of the main rails 110. The debris channels 40 are situated on both sides of transducer 12. The debris channels 40 of this invention provide a path for the particulate debris (contaminants) to pass through the center pad 30 (which is the closest part to the disk surface 11) without affecting the separation between the slider 100 and the disk surface 11. The debris channels 40 of this invention facilitate debris migration by forming an air channel to remove contaminants. The debris channels 40 also provide the recesses where head smears, formed by lube and wear debris, can accumulate without affecting the separation between the slider 100 and the disk surface 11. Therefore, these debris channels 40 eliminate or reduce the incidence of spacing losses which cause transducer 12 to write poorly.

In one embodiment, these debris channels 40 are approximately 1–3 microns wide and 1–3 microns deep. In length, the debris channels 40 run the full length of the center pad 30 which varies depending on a channel's particular location. For instance, the channels near the right 117 and left 119 edges of top surface 170 are shorter in length than the centrally situated debris channels. The depth of the debris channels 40 is generally achieved to form negative or ambient pressure in the debris channels 40 without altering the flying characteristics of the slider 100. The width of the debris channels 40 is generally adjusted to provide enough space for the debris to pass through without altering the flying characteristics of the slider 100. In operation, debris and other particulate contaminants that migrate along the path 24 of the air flow generally fall into one of the debris channels 40 rather than remaining on the surface 170 of center pad 30. By falling into one of the debris channels 40 and either remaining there temporarily or thereafter being pushed out the trailing side 150, this invention provides a mechanism of ridding the top surface 170 of debris and therefore preventing debris from collecting on and around the edges, corners and the surfaces of center pad 30. Also, this invention provides a mechanism of ridding the transducer 12 of debris and therefore preventing debris from collecting on and around the transducer 12 and its components.

It is appreciated that although there are only four debris channels 40 shown in the center pad 30 in FIG. 2A, this invention can operate equally well with different numbers of channels, e.g., two, six, eight, ten, or more, etc. The selection of four debris channels 40 is exemplary only. Also, although there are an equal number of channels cut in surface 170 on the right and left sides of transducer 12 in FIG. 2A, e.g., two on each side, this invention can operate equally well with different numbers of channels cut on either side of transducer 12. Further, although the debris channels 40 of FIG. 2 are shown to be of the same depth, this invention is equally well suited for respective debris channels 40 of different depth within center pad 30.

Figure 2B:
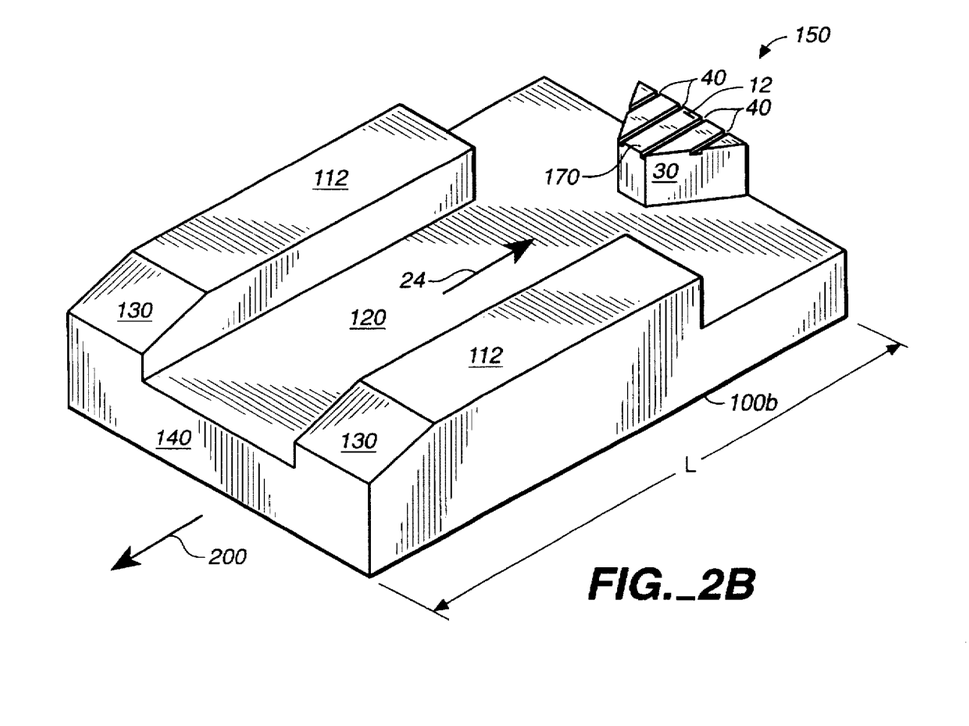
FIG. 2B is a perspective view of a second embodiment of this invention incorporated within a center pad of a tri-pad slider.

In FIG. 2B, a second embodiment of a tri-pad slider 100b is substantially the same as the first embodiment shown in FIG. 2A with the only difference being that main rails 112 do not extend the full length L of slider 100b.

Figure 3:
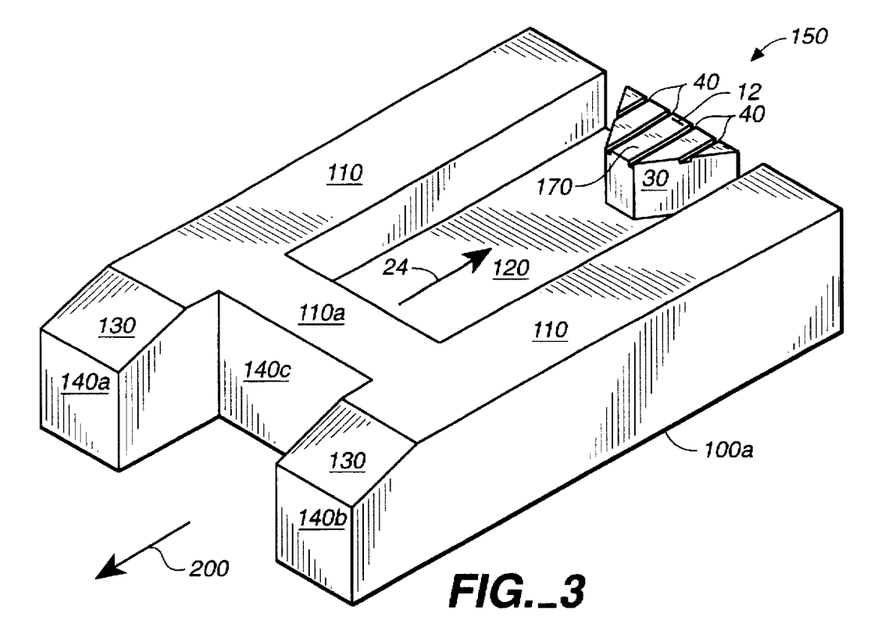
FIG. 3 is a perspective view of a third embodiment of this invention incorporated within a center pad of a tri-pad slider.

In FIG. 3, a third embodiment of tri-pad slider 100a of this invention includes two main rails 110 located on either side of slider 100a which are connected by a bridge 110a or cross rail, that is disposed between the main rails 110 and forms another air bearing surface. Slider 100a contains three separate leading sides 140a, 140c and 140b. Between main rails 110 is located a generally depressed region 120 on which is located the center pad 30 of this invention. The relative direction of movement of slider 100a with respect to the surface 11 of disk 10 is shown as direction 200. The direction of air flow (and debris migration) over the recessed region 120 and between the main rails 110 is shown by arrow 24. Analogous to FIGS. 2A and 2B, the center pad 30 of FIG. 3 contains debris channels 40 cut into top surface 170 on either side of transducer 12. These debris channels 40 perform the same functions as described with reference to FIGS. 2A and 2B, that is, to provide a path for migrating debris out from the surface 170 of center pad 30 to prevent debris collection on the edges, corners, and top surface of center pad 30.

The transducer 12 of sliders 100, 100b, and slider 100a can be of a number of different designs within the scope of this invention. For instance, transducer 12 can be of an inductive type or can be a composite of inductive and magneto-resistive (MR) components. Transducer 12 can be thin film or planar.

The debris channels 40 of this invention can be manufactured using a number of different techniques including cutting the grooves into center pad 30 using a diamond saw or using an etching process and a mask to etch the debris channels 40 into surface 170. Various etching techniques can be used in accordance with this invention including ion milling techniques and reactive ion etching. Manufacturing throughput can be increased if the etching step that fabricates the debris channels 40 is performed in conjunction with other etching processes that form the general shape of the slider (e.g., etching processes that form the main rails 110, center pad 30, ramps 130, depressed region 120, etc.).

Figure 4:
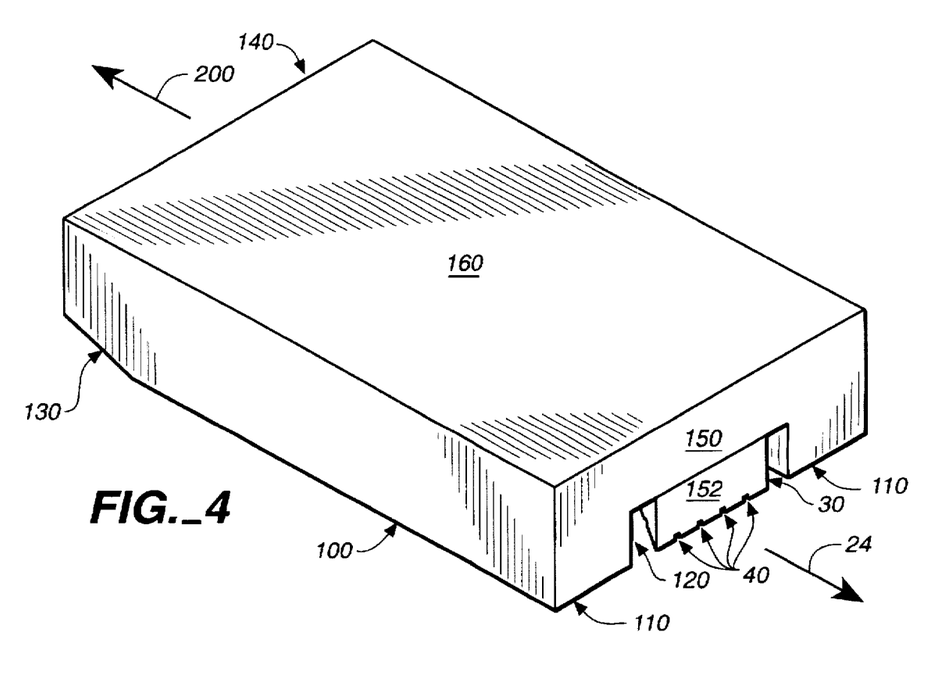
FIG. 4 is a perspective view of the back side of the first embodiment of the tri-pad slider having the center pad of this invention.

In FIG. 4, slider 100 is shown to illustrate the trailing side 150 of slider 100 including the trailing side 152 of center pad 30 and the bottom surface 160 of slider 100. In one embodiment, the trailing side 152 of center pad 30 and the trailing side 150 of slider 100 lie within a common plane. Although different with respect to the front portion 140, FIG. 4 also accurately depicts the components situated along the trailing side 150 of slider 100a of this invention. The trailing side 150 of slider 100 is shown along with main rails 110. The edge of the generally recessed surface 120 is also shown on either side of the center pad 30. Shown also are the back sides and edges of debris channels 40. The edge of the front surface 140 of slider 100 is also shown along with an edge of ramp 130. The direction of relative movement of the slider 100 with respect to the disk surface 11 is shown as direction 200 with the air flow movement through slider 100 shown as direction 24.

Figure 5:
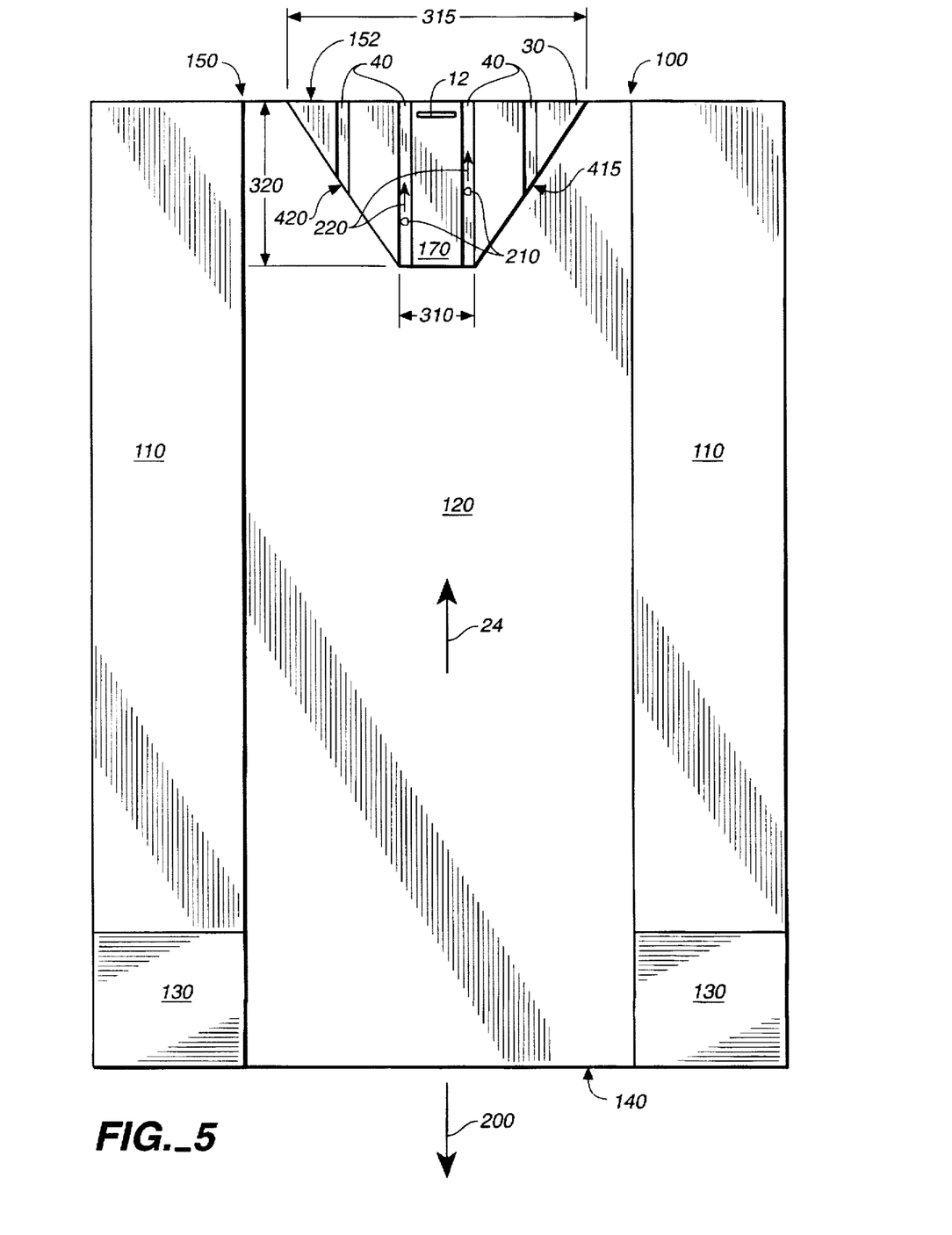
FIG. 5 is a plan view of the first embodiment shown in FIG. 2A.

In FIG. 5, a plan view of the first embodiment of the slider 100 of this invention is shown including a plan view of center pad 30. Center pad 30 is approximately 10–11 mils in dimension along a minor width measured along 310, is approximately 13–15 mils in dimension along a major width measured along 315, and is approximately 10–11 mils in dimension alone, a length measured along 320. Both the major width 315 and the minor width 310 are located between a left side 420 and a right side 415 of center pad 30. These measurements are exemplary of a typical center pad 30, however, it is appreciated that the debris channels 40 of this invention can be applied to center pads 30 of various other sizes and shapes. The transducer 12 is also shown in FIG. 5. Plan views of main rails 110 are shown along with the generally recessed region 120 and ramps 130 of slider 100. It is appreciated that the debris channels 40 of center pad 30 are not cut deep enough to reach the bottom surface 120 but are rather cut in relatively shallow depth beneath the top surface 170 (see FIG. 7).

In FIG. 5, two exemplary pieces of debris 210 are shown in two debris channels 40. This debris 210 is following a direction of migration 220 toward the trailing side 152 of the center pad 30 under air forces. This direction of migration 220 is driven by the direction of air flow 24, also shown in FIG. 5.

Figure 6:
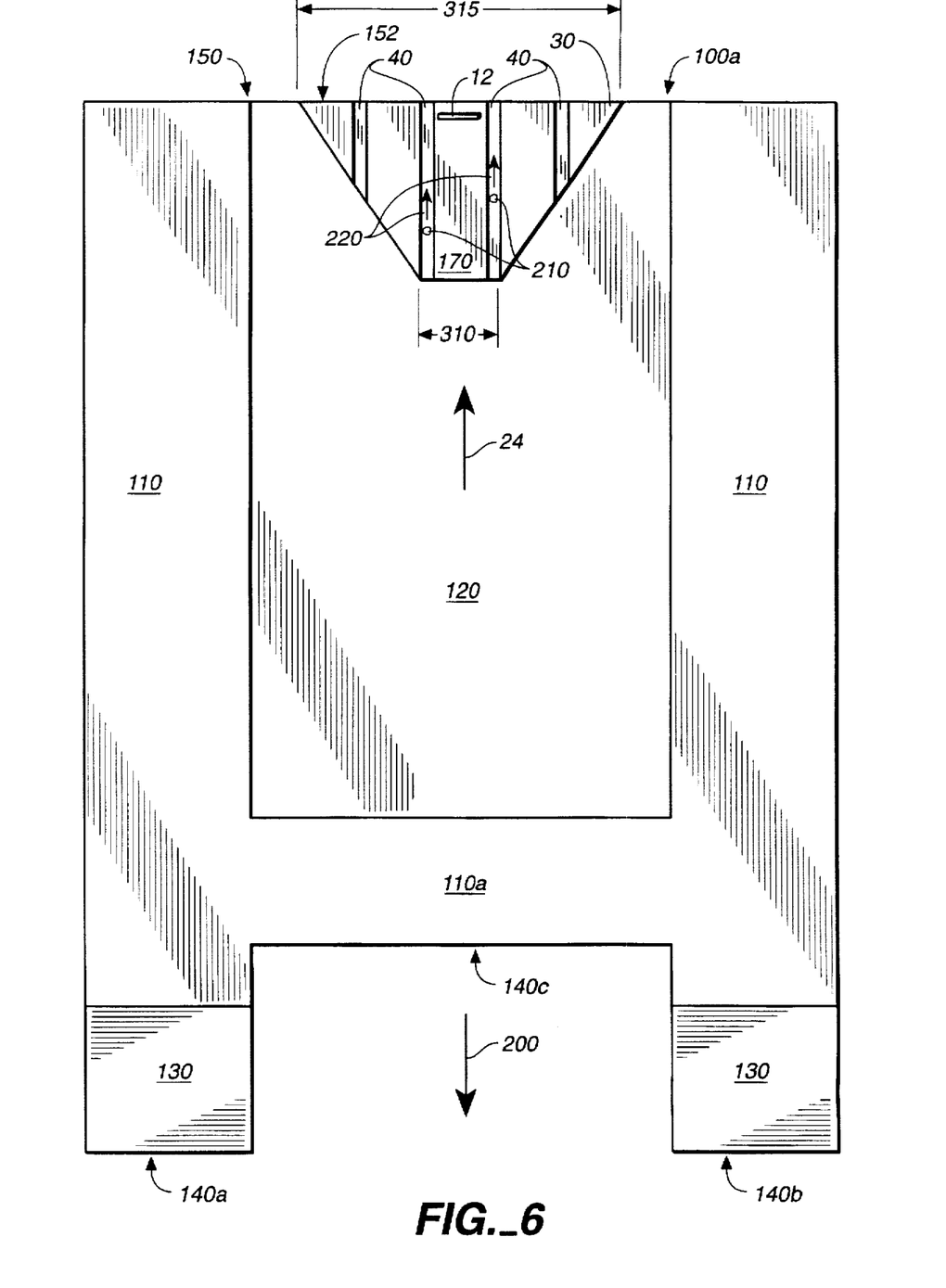
FIG. 6 is a plan view of the third embodiment shown in FIG. 3.

In FIG. 6, a plan view of the third embodiment of the slider 100a of this invention is shown including a plan view of center pad 30. The major and minor width and the length of center pad 30 of FIG. 6 are the same as in FIG. 5. Also shown are plan views of main rails 110, the bridge 110a, the centrally recessed region 120 and ramps 130. Front surface edges 140a, 140b and 140c are also shown. In FIG. 6, two exemplary pieces of debris 210 are shown in two debris channels 40 following a direction of migration 220 toward the trailing side 152 of the center pad 30. This direction of migration 220 is driven by the direction of air flow 24.

Figure 7:
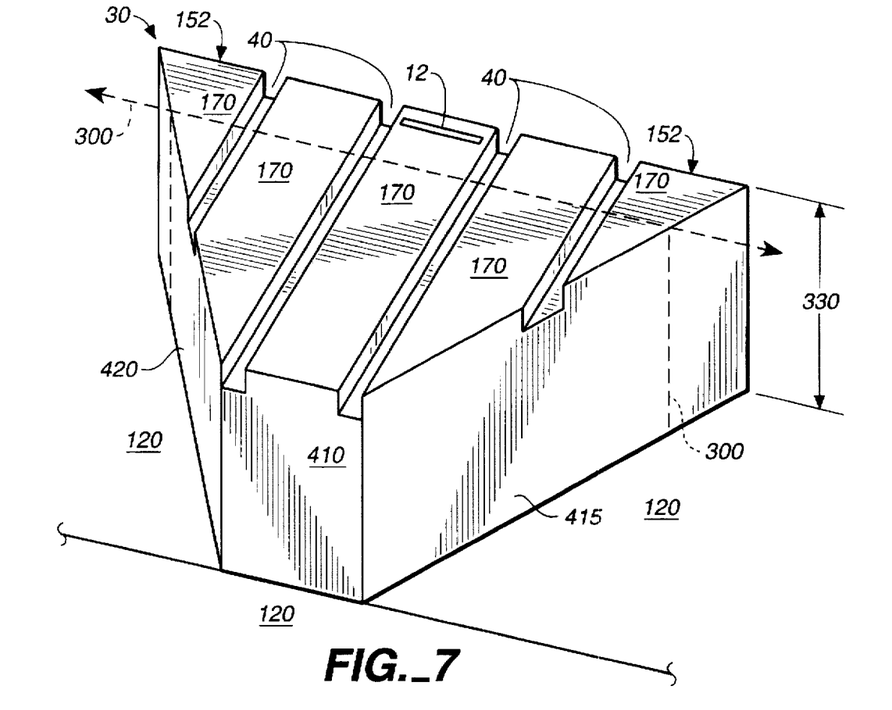
FIG. 7 is an enlarged perspective view of the center pad of this invention showing the debris channels cut in the air bearing surface of the center pad.

FIG. 7 illustrates an enlarged perspective view of the center pad 30 of this invention. As shown, the center pad 30 extends up from the generally recessed region 120 and it is approximately 5–10 mils from the surface of region 120 to the top of surface 170 (measured as dimension 330) of center pad 30. The longitudinal debris channels 40 are cut into surface 170 approximately 1–3 microns deep and approximately 1–3 microns wide. Therefore, as FIG. 7 illustrates, the debris channels 40 are not cut deep enough to reach the bottom surface 120 but are relatively shallow with respect to the height 330 of top surface 170. An expanded view of the transducer 12 is also shown. In all of the sliders, the center pad 30 is fabricated out of a composite of alumina and titanium carbide. Also shown in FIG. 7 is a leading side 410 of center pad 30, a back or trailing side 152 of the center pad 30, a first side wall 415 of center pad 30, and a second side wall 420 of center pad 30.

In operation, slider 100 with center pad 30 flies over a spinning magnetic disk media 10 at a distance of about 1–2 micro inches. Longitudinal channels 40 reduce contaminant buildup on center pad 30 by attracting contaminants and passing at least some of the contaminants through to trailing side 152 of center pad 30. In particular, migrating debris tends to fall and lodge in the debris channels 40 and become trapped there or become forced through the debris channels 40 and exit on the trailing side 152 via air forces. Since the debris channels 40 are only 1–3 microns deep and 1–3 microns wide and only run the length of the center pad 30, and since the transducer 12 is flying approximately 1–2 micro inches from the magnetic disk 10, the debris channels 40 of this invention do not measurably alter the magnetic field characteristics of the transducer 12 during its reading or writing operations nor do they alter the flying height characteristics of the slider 100, 100b or 100a above disk 10 in any substantial amount.

Figure 8:
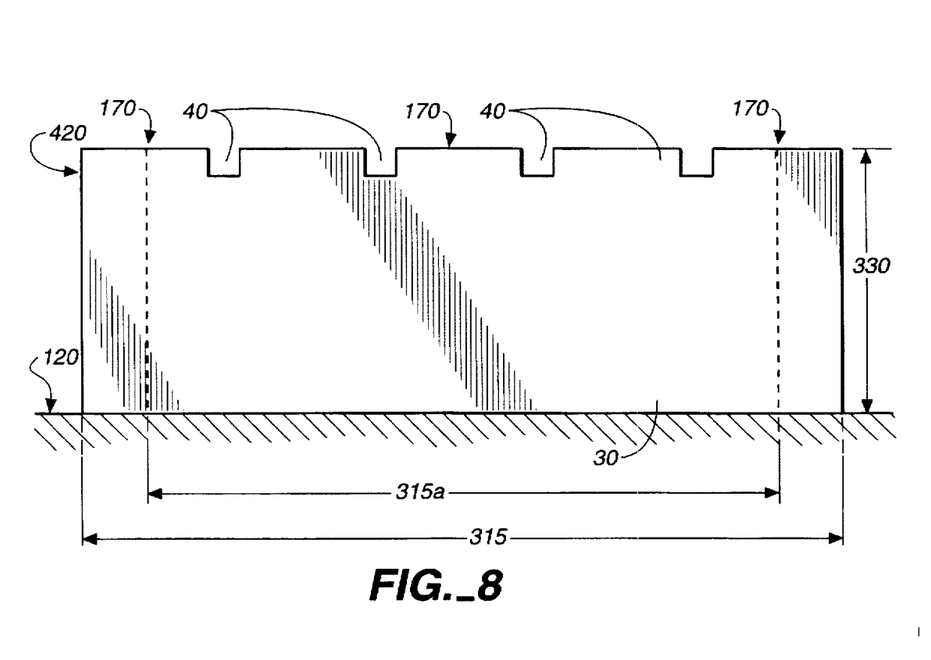
FIG. 8 is a cross sectional view of the center pad of this invention showing cross sections of the debris channels cut along a plane as shown in FIG. 7.

In FIG. 8, a cross section of center pad 30 of this invention is shown along plane 300 of FIG. 7. In this cross sectional view, the depths and widths of debris channels 40 are illustrated as being only a small fraction of the length 330. The major width 315 is also shown. Also illustrated is the width 315a of the center pad 30 as measured along the cutting plane 300.

I claim:

1. An air bearing slider for use in a disk drive, the slider comprising:

a leading side and a trailing side;

first and second main rails each having an air bearing surface;

a center pad having an air bearing surface and disposed adjacent to the trailing side of the slider and between the first and second main rails, the center pad having a leading side, a trailing side, first and second side walls and a width between the first side wall and the second side wall;

a transducer disposed within the center pad;

at least one longitudinal channel disposed within the center pad between the transducer and one of the first and second side walls, the longitudinal channel extending across the air bearing surface of the center pad from the leading side of the center pad to the trailing side of the center pad in a direction substantially parallel to the main rails, the longitudinal channel for reducing contaminant buildup on the center pad by attracting contaminants and passing at least some of the contaminants through to the trailing side of the center pad; and wherein the longitudinal channel comprises a width that is relatively small compared to the width of the center pad, such that the longitudinal channel has an insubstantial effect on air bearing flight characteristics of the slider.

2. The air bearing slider of claim 1 further comprising a bridge disposed between the first and the second main rails, the bridge having an air bearing surface.

3. The air bearing slider of claim 1 wherein the width of the longitudinal channel is approximately 1–3 microns wide.

4. The air bearing slider of claim 1 wherein the depth of the longitudinal channel is approximately 1–3 microns deep.

5. The air bearing slider of claim 1 wherein the length of the longitudinal channel is within a range of approximately 10–13 mils long.

6. The air bearing slider of claim 2 wherein the width of the longitudinal channel is approximately 1–3 microns wide and wherein the depth of the longitudinal channel is approximately 1–3 microns deep.

7. The air bearing slider of claim 2 wherein the length of the longitudinal channel is within a range of approximately 10–13 mils long.

8. An air bearing slider for use in a disk drive, the slider comprising:

first and second main rails;

a center pad having an air bearing surface and disposed between the first and second main rails, the center pad having a leading side, a trailing side, first and second side walls and a width between the first side wall and the second side wall;

a transducer disposed within the center pad;

a first plurality of longitudinal channels disposed within the center pad between the transducer and the first side wall;

a second plurality of longitudinal channels disposed within the center pad between the transducer and the second side wall, the first and second plurality of longitudinal channels for reducing contaminant buildup on the center pad by attracting contaminants and passing at least some of the contaminants through to the trailing side of the center pad; and wherein each longitudinal channel extends across the air bearing surface of the center pad from the leading side to the trailing side of the center pad in a direction substantially parallel to the direction of air flow over the air bearing surface of the center pad.

9. An air bearing slider as described in claim 8 wherein each longitudinal channel comprises a width that is relatively small compared to the width of the center pad, such that the first and second plurality of longitudinal channels have an insubstantial effect on air bearing flight characteristics of the slider.

10. The air bearing slider of claim 9 further comprising a bridge disposed between the first and the second main rails, the bridge having an air bearing surface.

11. The air bearing slider of claim 9 wherein the width of each longitudinal channel is approximately 1–3 microns wide.

12. The air bearing slider of claim 9 wherein the depth of each longitudinal channel is approximately 1–3 microns deep.

13. The air bearing slider of claim 10 wherein the length of each longitudinal channel is within a range of approximately 10–13 mils long.

14. The air bearing slider of claim 10 wherein the width of each longitudinal channel is approximately 1–3 microns wide and wherein the depth of each longitudinal channel is approximately 1–3 microns deep.

15. The air bearing slider of claim 10 wherein the length of each longitudinal channel is within a range of approximately 10–13 mils long.

16. The air bearing slider of claim 8 wherein the first and second plurality of longitudinal channels reduces contaminant buildup on the air bearing surface of the center pad.

17. A disk drive comprising:
   a) a disk coupled to a spindle motor,
   b) a rotary actuator arrangement having a head stack assembly; and
   c) wherein the head stack assembly comprises an actuator arm coupled to an air bearing slider, the air bearing slider comprising:

first and second main rails each having an air bearing surface;

a center pad having an air bearing surface and disposed adjacent to a trailing side of the slider and between the first and second main rails, the center pad having a leading side, a trailing side, first and second side walls and a width between the first side wall and the second side wall;

a transducer disposed within the center pad;

at least one longitudinal channel disposed within the center pad between the transducer and one of the first and second side walls, the longitudinal channel extending across the air bearing surface of the center pad from the leading side of the center pad to the trailing side of the center pad in a direction substantially parallel the direction of air flow over the air bearing surface of the center pad, the longitudinal channel for reducing contaminant buildup on the center pad by attracting contaminants and passing at least some of the contaminants through to the trailing side of the center pad; and wherein the longitudinal channel comprises a width that is relatively small compared to the width of the center pad, such that the longitudinal channel has an insubstantial effect on air bearing flight characteristics of the slider.

18. The disk drive of claim 17 further comprising a bridge disposed between the first and the second main rails, the bridge having an air bearing surface.

19. The disk drive of claim 17 wherein the width of the longitudinal channel is approximately 1–3 microns wide and wherein the depth of the longitudinal channel is approximately 1–3 microns deep.

20. The disk drive of claim 17 wherein the length of the longitudinal channel is within a range of approximately 10–13 mils long.

21. The disk drive of claim 18 wherein the width of the longitudinal channel is approximately 1–3 microns wide, wherein the depth of the longitudinal channel is approximately 1–3 microns deep and wherein the length of the longitudinal channel is within a range of approximately 10–13 mils long.

* * * * *